United States Patent
Tani et al.

(10) Patent No.: US 7,306,876 B2
(45) Date of Patent: Dec. 11, 2007

(54) METHOD FOR PRODUCING MEMBRANE-ELECTRODE STRUCTURE AND POLYMER ELECTROLYTE FUEL CELL

(75) Inventors: Masaki Tani, Wako (JP); Hiroshi Shinkai, Wako (JP); Katsuhiko Kohyama, Wako (JP); Ichiro Tanaka, Wako (JP); Yuichiro Hama, Wako (JP); Junichi Yano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 534 days.

(21) Appl. No.: 10/721,505

(22) Filed: Nov. 26, 2003

(65) Prior Publication Data

US 2004/0115499 A1  Jun. 17, 2004

(30) Foreign Application Priority Data

| Nov. 29, 2002 | (JP) | ............................. 2002-347580 |
| Dec. 18, 2002 | (JP) | ............................. 2002-366037 |
| Dec. 27, 2002 | (JP) | ............................. 2002-379820 |
| Oct. 30, 2003 | (JP) | ............................. 2003-371048 |
| Oct. 30, 2003 | (JP) | ............................. 2003-371049 |
| Oct. 31, 2003 | (JP) | ............................. 2003-371836 |

(51) Int. Cl.
*H01M 4/00*  (2006.01)
*H01M 4/88*  (2006.01)
*B05D 5/12*  (2006.01)

(52) U.S. Cl. .......................... 429/44; 429/30; 502/101; 521/27; 427/115

(58) Field of Classification Search .................. 429/40, 429/42, 43, 44, 45, 30; 521/27, 28; 502/101; 427/115

See application file for complete search history.

(56) References Cited

U.S. PATENT DOCUMENTS 3,956,014 A * 5/1976 Landsman et al. ............ 429/42
4,104,197 A * 8/1978 Heffler ........................ 502/101
4,568,442 A * 2/1986 Goldsmith ................... 204/284

FOREIGN PATENT DOCUMENTS

| JP | 06-44984 | * 2/1994 |
| JP | 2001-345110 | 12/2001 |

* cited by examiner

*Primary Examiner*—Raymond Alejandro
(74) *Attorney, Agent, or Firm*—Arent Fox LLP

(57) ABSTRACT

A membrane-electrode structure having an electrode catalyst layer adhered to a diffusion electrode, wherein the structure is manufactured by applying a catalyst paste onto a sheet substrate, and then dried to form a plurality of electrode catalyst layers. The electrode catalyst layers are thermally transferred onto each side of a polymer electrolyte membrane to form a laminated body. A first slurry is applied on a carbon substrate layer, and dried to form a water-repellent layer, and then, a second slurry is applied on the water-repellent layer, and dried to form a hydrophilic layer to form a diffusion electrode. The diffusion electrode is then laminated on the electrode catalyst layer through the hydrophilic layer, and then pressed under heating to integrate the laminated body and the diffusion electrode.

13 Claims, 10 Drawing Sheets

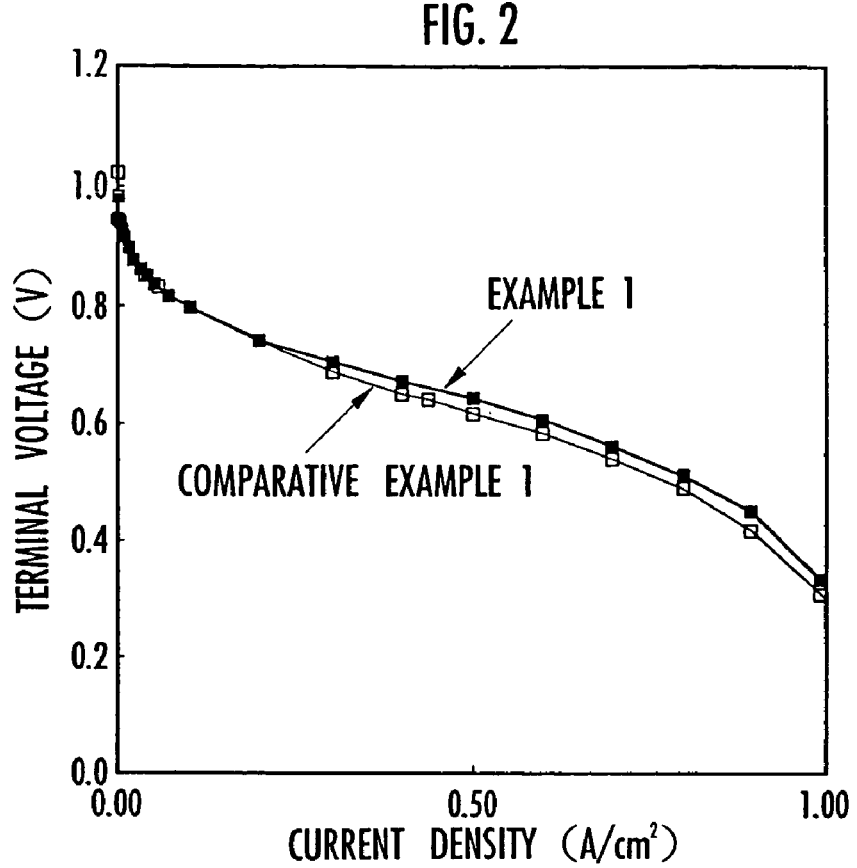
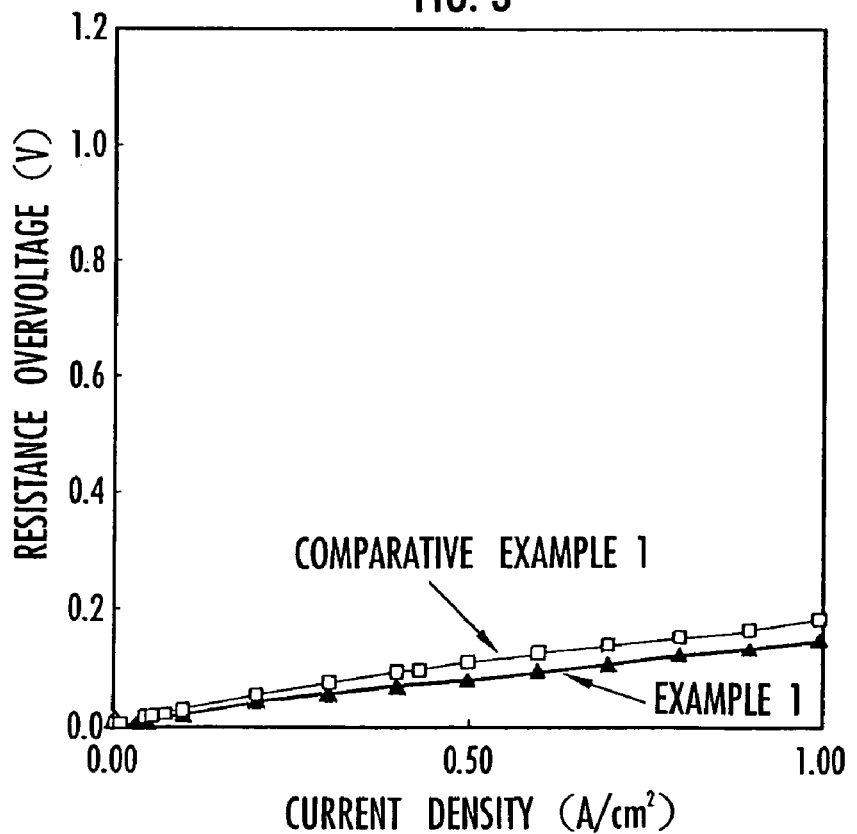

METHOD FOR PRODUCING MEMBRANE-ELECTRODE STRUCTURE AND POLYMER ELECTROLYTE FUEL CELL

BACKGROUND OF THE INVENTION

1. Field of the Invention

The present invention relates to a method for producing a membrane-electrode structure used for a polymer electrolyte fuel cell.

2. Description of the Related Art

The petroleum source has been exhausted, and at the same time, environmental problems such as global warming due to the consumption of fossil fuel have increasingly become serious. Thus, a fuel cell receives attention as a clean power source for electric motors that is not accompanied with the generation of carbon dioxide. The above fuel cell has been widely developed, and some fuel cells have become commercially practical. When the above fuel cell is mounted in vehicles and the like, a polymer electrolyte fuel cell comprising a polymer electrolyte membrane is preferably used because it easily provides a high voltage and a large electric current.

As shown in FIG. 15, a membrane-electrode structure 10 has been known as a membrane-electrode structure used for the above polymer electrolyte fuel cell. The membrane-electrode structure 10 comprises: a pair of electrode catalyst layers 3, 3 formed by integrating by an ion conducting polymer binder, catalyst particles consisting of catalysts such as platinum supported by carbon particles such as carbon black; a polymer electrolyte membrane 1 capable of conducting ions, which is sandwiched between the electrode catalyst layers 3, 3; and diffusion electrodes 5, 5 that are laminated on the electrode catalyst layers 3, 3, respectively.

In the membrane-electrode structure 10, the electrode catalyst layer 3 is hydrophilic for the transference of protons or the elimination of water generated, and the like. On the other hand, the diffusion electrode 5 is configured such that a porous water-repellent layer 7 is formed on a carbon substrate layer 6 for the diffusion of reducing gas or oxidizing gas. The diffusion electrode 5 is laminated on the electrode catalyst layer 3 through the water-repellent layer 7. In the membrane-electrode structure 10, a separator acting also as a gas passage is further laminated on each of the diffusion electrodes 5, 5, so as to constitute a polymer electrolyte fuel cell.

In the polymer electrolyte fuel cell, one electrode catalyst layer 3 is used as a fuel electrode, and reducing gas such as hydrogen or methanol is introduced therein through the diffusion electrode 5 on the fuel electrode side. The other electrode catalyst layer 3 is used as an oxygen electrode, and oxidizing gas such as air or oxygen is introduced therein through the diffusion electrode 5 on the oxygen electrode side. Thus, protons are generated from the above reducing gas by the action of catalysts contained in the above electrode catalyst layer 3 on the fuel electrode side. The protons are transferred to the electrode catalyst layer 3 on the above oxygen electrode side through the polymer electrolyte membrane 1. Then, in the electrode catalyst layer 3 on the above oxygen electrode side, the protons are reacted with the above oxidizing gas introduced therein by the action of catalysts contained in the above electrode catalyst layer 3, so as to generate water. Thus, electric current can be generated by connecting the above fuel electrode with the above oxygen electrode through a conductor.

The above electrode structure has previously been produced by laminating the above diffusion electrode 5 on a laminated body that is obtained by attaching the above electrode catalyst layers 3, 3 to each side of the polymer electrolyte membrane 1, and then pressing them under heating (refer to e.g., Japanese Patent Laid-Open No. 2001-345110).

However, the above conventional production method has a problem in that since the diffusion electrode 5 is laminated on the electrode catalyst layer 3 that is hydrophilic through the water-repellent layer 7, even though they are pressed under heating, a sufficient adhesiveness might not be obtained between the electrode catalyst layer 3 and the diffusion electrode 5. If a sufficient adhesiveness is not obtained between the electrode catalyst layer 3 and the diffusion electrode 5, when a polymer electrolyte fuel cell comprising the above membrane-electrode structure 10 is produced, its resistance overvoltage increases, resulting in a decreased power generation efficiency.

SUMMARY OF THE INVENTION

It is an object of the present invention to provide a method for producing a membrane-electrode structure, which solves the above problem and has an excellent adhesiveness between an electrode catalyst layer and a diffusion electrode.

To achieve the above object, the method for producing a membrane-electrode structure of the present invention comprises the steps of: applying on a sheet substrate a catalyst paste consisting of an electron conducting material supporting a catalyst and an ion conducting material, and drying the same, so as to form an electrode catalyst layer; thermally transferring the above electrode catalyst layer onto each side of a polymer electrolyte membrane, so as to form a laminated body such that the above electrode catalyst layer is connected to each side of the above polymer electrolyte membrane; applying on a carbon substrate layer a first slurry comprising a water-repellent material and an electron conducting material and drying the same to form a water-repellent layer, and then applying on the above water-repellent layer a second slurry comprising an electron conducting material and an ion conducting material and drying the same to form a hydrophilic layer, so as to form a diffusion electrode consisting of the above carbon substrate, the above water-repellent layer and the above hydrophilic layer; and laminating the previously formed diffusion electrode on the above electrode catalyst layer of the above laminated body through the above hydrophilic layer, pressing the two under heating, so as to integrate the above laminated body and the above diffusion electrode.

In the production method of the present invention, when a diffusion electrode is formed, a water-repellent layer is first formed on a carbon substrate layer, and a second slurry is then applied on the water-repellent layer and dried, so as to form a hydrophilic layer. The second slurry has the same composition as the above catalyst paste with the exception that it contains an electron conducting material and an ion conducting material but does not contain a catalyst. However, in the present production method, the second slurry is applied on the water-repellent layer followed by drying to form the hydrophilic layer, so that an excellent adhesiveness can be obtained between the obtained hydrophilic layer and the water-repellent layer.

In the production method of the present invention, next, the diffusion electrode formed such that the hydrophilic layer is formed on the water-repellent layer in advance as described above is laminated on the electrode catalyst layer through the hydrophilic layer, and they are then pressed under heating. The hydrophilic layer formed on the diffusion electrode is made of the above second slurry, and thus, it has the same composition as the above electrode catalyst layer with the exception that it contains no catalysts. Accordingly, the above hydrophilic layer can be easily connected to the above electrode catalyst layer by the above pressurization under heating, so that an excellent adhesiveness can be obtained between the hydrophilic layer and the electrode catalyst layer.

As a result, the production method of the present invention enables the unification of the electrode catalyst layer and the diffusion electrode through the hydrophilic layer, thereby obtaining an excellent adhesiveness between the electrode catalyst layer and the diffusion electrode.

In addition, the production method of the present invention is characterized in that the second slurry contains a pore-forming material. Carbon fiber may be an example of such a pore-forming material. The second slurry containing such a pore-forming material is applied on the water-repellent layer followed by drying, so that the obtained hydrophilic layer can comprise pores formed between the carbon fibers and that the above reducing gas or oxidizing gas can be diffused through the pores.

Moreover, the production method of the present invention is characterized in that the above catalyst paste contains a pore-forming material. As in the case of the above second slurry, carbon fiber may be an example of such a pore-forming material. The catalyst paste containing such a pore-forming material is applied on the sheet substrate followed by drying, so that the obtained electrode catalyst layer can comprise pores formed between the carbon fibers and that the above reducing gas or oxidizing gas can be diffused through the pores, thereby allowing the reducing gas or oxidizing gas to effectively come into contact with the catalyst. Moreover, the generated water is effectively eliminated through the pores.

Further, in the production method of the present invention, when the above catalyst paste and the above second slurry contain the above pore-forming materials, the above hydrophilic layer and the above electrode catalyst layer are formed such that the ratio of the volume of pores with a pore size of 0.01 to 1 μm formed in the above electrode catalyst layer by the above pore-forming material to the volume of pores with a pore size of 0.01 to 1 μm formed in the above hydrophilic layer by the above pore-forming material becomes less than 1.0. This will enable the achievement of an excellent adhesiveness between the above electrode catalyst layer and the above diffusion electrode without inhibiting the diffusion of the above reducing gas or oxidizing gas. In contrast, if the above ratio is 1.0 or greater, even though a sufficient adhesiveness can be obtained between the above electrode catalyst layer and the above diffusion electrode, the diffusion of the above reducing or oxidizing gas is inhibited, thereby increasing concentration overvoltage.

Furthermore, in the production method of the present invention, the above hydrophilic layer and the above electrode catalyst layer are formed such that the ratio of the weight of an ion conducting material contained in the above electrode catalyst layer to the weight of an ion conducting material contained in the above hydrophilic layer is set within the range of 1.0 to 1.4. This will enable the achievement of an excellent adhesiveness between the above electrode catalyst layer and the above diffusion electrode. In contrast, if the above ratio is less than 1.0 or more than 1.4, the balance of water retention between the above electrode catalyst layer and the above diffusion electrode is altered, so that activation overvoltage or concentration overvoltage increases and that a sufficient power generation efficiency might not be obtained.

Still further, in the production method of the present invention, the above hydrophilic layer and the above electrode catalyst layer are formed such that the ratio of the weight of solid content in the above electrode catalyst layer to the weight of solid content in the above hydrophilic layer is set within the range of 1.0 to 3.5. This will enable the achievement of an excellent adhesiveness between the above electrode catalyst layer and the above diffusion electrode. In contrast, if the above ratio is less than 1.0 or more than 3.5, there is a possibility that a sufficient adhesiveness might not be obtained between them.

Generally, a carbon paper obtained by converting carbon fibers into a sheet is used as a carbon substrate layer described above. However, such a carbon paper has unevenness developed on a surface thereof. Accordingly, when the above water-repellent layer or hydrophilic layer is formed on the carbon paper, there is a possibility that a sufficient adhesiveness might not be obtained between the above electrode catalyst layer and the above diffusion electrode.

Thus, the production method of the present invention is characterized in that the above second slurry is applied on the above water-repellent layer and the same is then dried, so as to form a hydrophilic layer having the maximum height Rmax of surface roughness of 40 μm or lower.

In the production method of the present invention, when the above hydrophilic layer is formed on the above water-repellent layer formed on the above carbon substrate layer, the maximum height Rmax of surface roughness of the hydrophilic layer is set to 40 μm or lower. Thereafter, the above diffusion electrode is laminated on the above electrode catalyst layer through the above hydrophilic layer, and they are then pressed under heating. Thus, unevenness on the surface of the above diffusion electrode is reduced by the presence of the hydrophilic layer. This ensures the connection between the hydrophilic layer and the electrode catalyst layer, thereby obtaining an excellent adhesiveness between the diffusion electrode and the electrode catalyst layer.

When the maximum height Rmax of surface roughness of the hydrophilic layer exceeds 40 μm, an effect to reduce unevenness on the surface of the diffusion electrode cannot be fully obtained.

In addition, the production method of the present invention is characterized in that the above hydrophilic layer has a surface roughness in which the ratio of the surface area to the unit area is 1.25 or less. Unevenness on the surface of the above diffusion electrode can be more reliably reduced under the condition that the above hydrophilic layer has the above surface roughness. When the above hydrophilic layer has a surface roughness in which the ratio of the surface area to the unit area exceeds 1.25, there is a possibility that the effect to reduce unevenness on the surface of the diffusion electrode might not be fully obtained.

Moreover, the production method of the present invention is characterized in that the above water-repellent layer and the above hydrophilic layer are formed such that the differential pressure between one side of the above diffusion electrode and the other side thereof is set within the range between 100 and 300 mmAq, when the air is supplied at a flow rate of 0.5 L/cm$^2$/min in the direction of the thickness of the above diffusion electrode. According to the production method of the present invention, when the above differential pressure is within the above range, unevenness on the surface of the above diffusion electrode is reduced, thereby obtaining a membrane-electrode structure having an excellent adhesiveness between the diffusion electrode and the electrode catalyst layer.

When the above differential pressure is less than 100 mmAq, the amount of the second slurry applied is insufficient, and thereby the effect to reduce unevenness on the surface of the diffusion electrode might not be fully obtained. On the other hand, when the above differential pressure exceeds 300 mmAq, the amount of the second slurry applied is sufficient, and therefore, unevenness on the surface of the diffusion electrode is considerably reduced. However, gas diffusion on the diffusion electrode decreases, and the obtained membrane-electrode structure might not have a sufficient power generation efficiency.

By the way, when the above membrane-electrode structure is constructed such that the polymer electrolyte membrane is a sulfonated polyarylene based polymer and that the polymer electrolyte contained in the electrode catalyst layer is a perfluoroalkylene sulfonic acid polymer, in order to obtain a sufficient adhesiveness between the polymer electrolyte membrane and the electrode catalyst layer, a thermal transfer of the electrode catalyst layer from the sheet substrate side to the polymer electrolyte membrane side should be carried out under high-temperature and high-pressure conditions.

However, if the thermal transfer is carried out under high-temperature and high-pressure conditions, there is a possibility that a pore-forming material such as carbon fibers might be compressed more than necessary in the above electrode catalyst layer and a certain amount of pores might not be formed, and that a sufficient gas diffusion might not be obtained. Moreover, if a certain amount of pores cannot be formed in the above electrode catalyst layer, there is an inconvenience in that water generated on the oxygen electrode side is retained therein, thereby causing an increased concentration overvoltage.

Hence, the production method of the present invention is characterized in that the above polymer electrolyte membrane is formed from a sulfonated polyarylene based polymer solution and that when the above catalyst paste comprises a catalyst particle consisting of a catalyst supported by a carbon particle, an organic solvent solution comprising a perfluoroalkylene sulfonic acid polymer, and a pore-forming material, the above electrode catalyst layer is dried to such an extent that the content of the solvent becomes 20% or less by weight based on the total weight of the above electrode catalyst layer, and the dried electrode catalyst layer is then thermally transferred onto and connected to the above polymer electrolyte membrane.

According to the production method of the present invention, the above electrode catalyst layer is dried to such an extent that the solvent content becomes 20% or less by weight based on the total weight of the above electrode catalyst layer, and the thermal transfer is then carried out. This step will enable the thermal transfer to be carried out under a pressure lower than that of the conventional thermal transfer. As a result, the above pore-forming material is not compressed more than necessary in the above electrode catalyst layer, and accordingly, a certain amount of pores are formed. Thus, a sufficient gas diffusion can be obtained, and further, a sufficient adhesiveness can be obtained between the polymer electrolyte membrane and the electrode catalyst layer.

The above thermal transfer is carried out under a pressure within the range of 1 to 5 MPa, for example. If the pressure is less than 1 MPa, a sufficient adhesiveness might not be obtained between the polymer electrolyte membrane and the electrode catalyst layer. If the pressure exceeds 5 MPa, the pore-forming material is compressed, and thereby a certain amount of pores might not be formed.

The above catalyst paste is applied on the above sheet substrate whose surface has a contact angle to water of 55° to 105°. When the contact angle to water of the surface of the above sheet substrate is less than 55°, it is difficult to transfer the above electrode catalyst layer to the above polymer electrolyte membrane side by the thermal transfer. On the other hand, when the contact angle to water of the surface of the above sheet substrate exceeds 105°, it is difficult to apply the above catalyst paste on the above sheet substrate, and thereby the above electrode catalyst layer might not be uniformly formed.

Moreover, when the above diffusion electrode is laminated on each electrode catalyst layer and they are then pressed under heating, the applied pressure is set within the range of 0.5 to 4 MPa. If the pressure is lower than 0.5 MPa, there is a possibility that the above polymer electrolyte membrane might not be connected to the above electrode catalyst layer and the above backing layer. On the other hand, if the pressure is higher than 4 MPa, there is a possibility that an intralayer separation of the backing layer might occur, or that pores formed in the above electrode catalyst layer might be compressed and disrupted.

It should be noted that the term "sulfonated polyarylene based polymer" is used in the present specification to mean a sulfonated product of a polymer with a structure represented by the following formula:

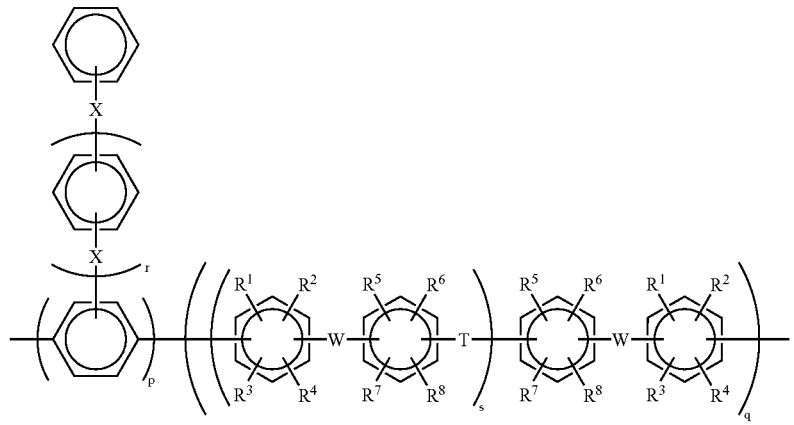

wherein —X— represents a single bond or divalent organic group; —W— represents a divalent electron attracting group; —T— represents a divalent organic group; each of $R^1$ to $R^8$ represents a fluorine atom, hydrogen atom, alkyl group, aryl group or allyl group, wherein they may be identical to or different from each other; represents a number of 0. 5 to 100; q represents a number of 99.5 to 0; r represents an integer of 0 to 10; and s represents an integer of 1 to 100.

Examples of the above divalent organic group may include electron attracting groups such as —CO—, —CONH—, —$(CF_2)_p$— (wherein p is an integer of 1 to 10), —$C(CF_3)_2$—, —COO—, —SO— or —$SO_2$—, groups such as —O—, —S—, —CH=CH— or —C≡C— and electron donating groups represented by the following formula:

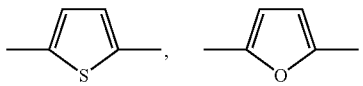

Examples of the above divalent electron attracting group may include groups such as —CO—, —CONH—, —$(CF_2)_p$— (wherein p is an integer of 1 to 10), —$C(CF_3)_2$—, —COO—, —SO— or —$SO_2$—.

Moreover, the present invention also includes a polymer electrolyte fuel cell, which uses a membrane-electrode structure obtained by the above production method. The polymer electrolyte fuel cell of the present invention can be used as a power source or as a backup power source for e.g., electrical apparatuses such as personal computers or a mobile phone. Furthermore, the polymer electrolyte fuel cell of the present invention can also be used as a power source for e.g., transport machines such as automobiles or watercraft such as submarine.

BRIEF DESCRIPTION OF THE DRAWINGS

FIG. 2 is a graph showing an example of the power generation efficiency of a membrane-electrode structure constituted such that a water-repellent layer and a hydrophilic layer are formed in a diffusion electrode by the production method of the present invention;

FIG. 3 is a graph showing another example of the power generation efficiency of a membrane-electrode structure constituted such that a water-repellent layer and a hydrophilic layer are formed in a diffusion electrode by the production method of the present invention;

DETAILED DESCRIPTION OF THE PREFERRED EMBODIMENTS

EXAMPLE 1

Figure 1:
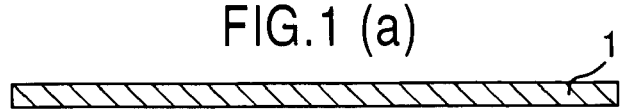
FIGS. 1(a)-(f) are views illustrating a production process, which schematically show an example of the method for producing a membrane-electrode structure of the present invention.
Figure 1:
Figure 1:
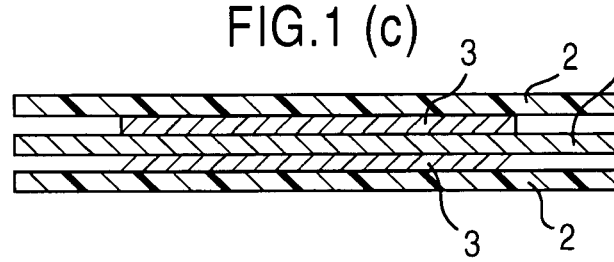
Figure 1:
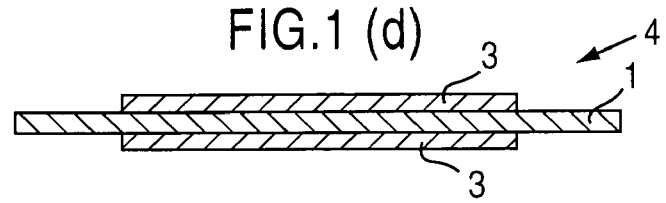
Figure 1:
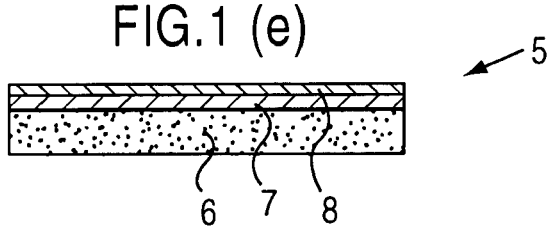
Figure 1:
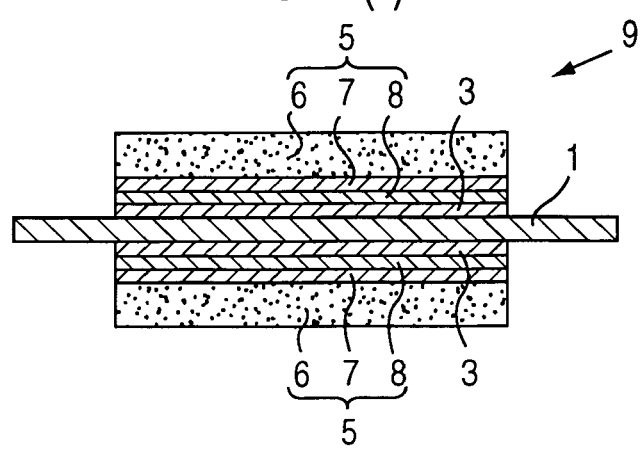

Next, the method for producing a membrane-electrode structure of the present example will be described with reference to FIGS. 1(a)-(f).

In the production method in the present example, first, a sulfonated polyarylene based polymer is prepared. The sulfonated polyarylene based polymer can be prepared, for example, by adding concentrated sulfuric acid to a polyarylene based polymer represented by the following formula (1) for sulfonation:

The polyarylene based polymer represented by the above formula (1) can be prepared, for example, by the following procedure. First, 67.3 parts by weight of 2,2-bis(4-hydroxyphenyl)-1,1,1,3,3,3-hexafluoropropane (bisphenol AF), 53.5 parts by weight of 4,4'-dichlorobenzophenone, and 34.6 parts by weight of potassium carbonate are added into a mixed solvent consisting of N,N-dimethylacetoamide and toluene, and the mixture is heated in a nitrogen atmosphere and reacted at 130° C. while stirring. Water generated as a result of the reaction is removed out of the system by azeotropic distillation with toluene, and the reaction is continued until almost no water is generated. Thereafter, the reaction temperature is gradually raised up to 150° C. to remove toluene. The reaction is continued at 150° C. for 10 hours, and then, 3.3 parts by weight of 4,4'-dichlorobenzophenone is added thereto, followed by the reaction for 5 hours.

The obtained reaction solution is cooled, and a precipitate of an inorganic compound generated as a by-product is eliminated by filtration. The filtrate is then placed in methanol. The precipitated product is filtrated, recovered, and dried. Thereafter, the dried product is dissolved in tetrahydrofuran. This is reprecipitated from methanol, so

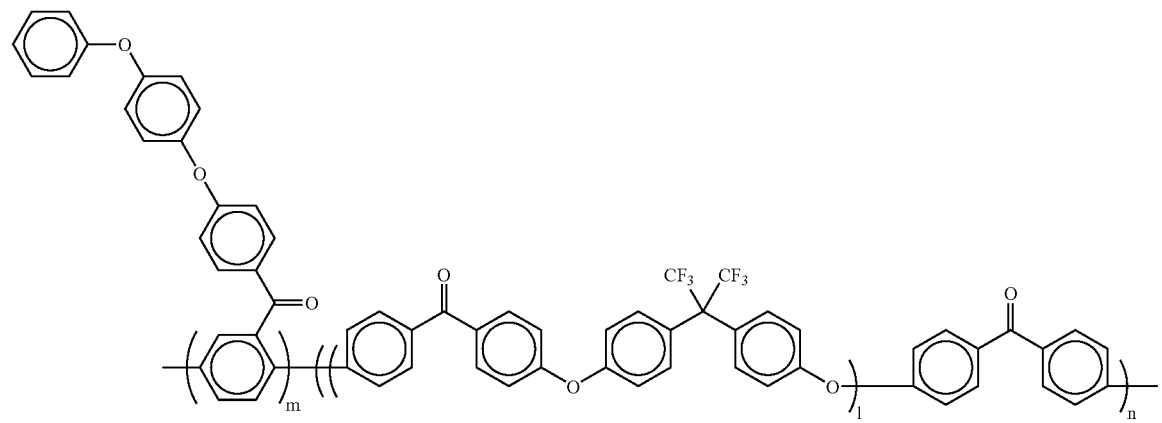

(1)

In the above formula (1), m:n=0.5 to 100:99.5 to 0, and 1 represents an integer of 1 or greater.

as to obtain an oligomer represented by the following formula (2):

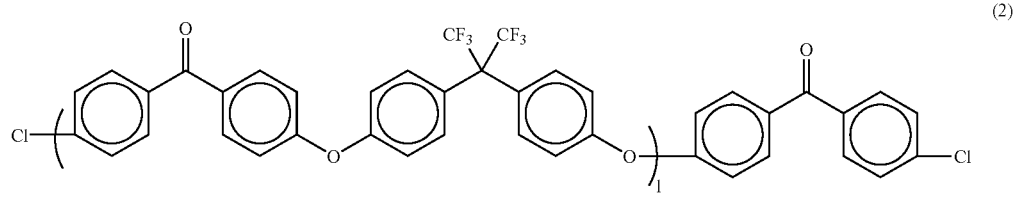

(2)

In the oligomer of the formula (2) obtained as above, the mean value of 1 is 18.9, for example.

Thereafter, 28.4 parts by weight of the oligomer represented by the above formula (2), 29.2 parts by weight of 2,5-dichloro-4'-(4-phenoxy)phenoxybenzophenone, 1.37 parts by weight of bis (triphenylphosphine) nickel dichloride, 1.36 parts by weight of sodium iodide, 7.34 parts by weight of triphenylphosphine, and 11.0 parts by weight of zinc dust are placed in a flask, followed by leaving in a dry nitrogen gas for nitrogen substitution. Thereafter, N-methyl-2-pyrrolidone is added thereto, and the mixture is heated to 80° C., followed by polymerization for 4 hours while stirring. The polymerization solution is diluted with tetrahydrofuran, solidified with hydrochloric acid/methanol, and recovered. The recovered product is repeatedly washed with methanol, and it is then dissolved in tetrahydrofuran. This is reprecipitated from methanol and purified. The filtrated polymer is then subjected to vacuum drying, so as to obtain a polyarylene based polymer represented by the formula (1).

Sulfonation of the polyarylene based polymer represented by the formula (1) can be carried out, for example, by adding 96% sulfuric acid to the polyarylene based polymer and then stirring the mixture for 24 hours under a nitrogen current.

Instead of the sulfonated polyarylene based polymer represented by the formula (1), a sulfonated polyarylene based polymer represented by the following formula (3) may also be used as a sulfonatedpolyarylene based polymer described above.

lyte solution by the cast method, and the membrane is dried in an oven, so as to form, e.g., a polymer electrolyte membrane 1 having a dry film thickness of 20 to 60 µm, as shown in FIG. 1(a).

Subsequently, a catalyst such as platinum is supported by an electron conducting material such as carbon black (furnace black) at a weight ratio of catalyst:electron conducting material=50:50 for example, so as to prepare catalyst particles. Thereafter, the above catalyst particles and carbon fibers (e.g., VGCF (trade name) manufactured by Showa Denko K.K.) used as pore-forming materials are uniformly dispersed in a perfluoroalkylene sulfonic acid polymer (e.g., Nafion (trade name) manufactured by DuPont) solution used as an ion conducting material solution at a weight ratio of catalyst particle:pore-forming material:ion conducting material=5:2:7 for example, so as to prepare a catalyst paste.

Thereafter, the above catalyst paste is screen printed on a fluorine resin mold releasing film 2 as shown in FIG. 1(b) such that the above catalyst is kept thereon in an amount of 0.4 to 0.5 mg/cm². The catalyst paste is then dried, so as to form an electrode catalyst layer 3. Thereafter, as shown in FIG. 1(c), the polymer electrolyte membrane 1 is sandwiched between a pair of the electrode catalyst layers 3, 3, and hot pressing is then performed from above the fluorine resin mold releasing film 2.

The hot pressing is carried out, for example, by applying a pressure within the range between 2 and 5 MPa on the surface at a temperature of 100° C. to 160° C. for 5 to 30

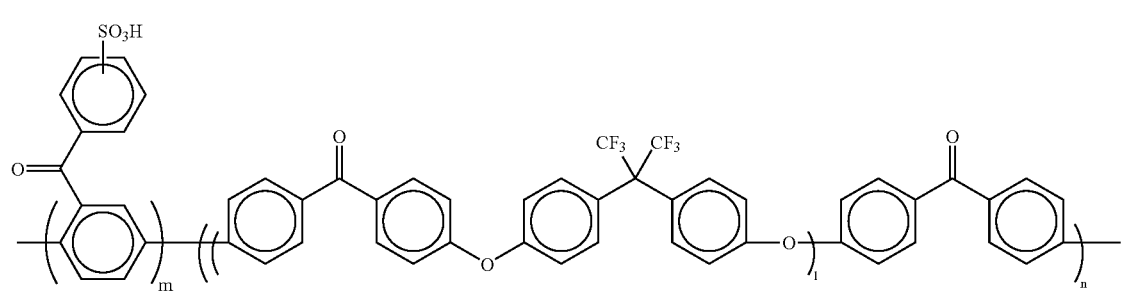

(3)

The copolymer represented by the formula (3) can be obtained by copolymerizing a monomer represented by the following formula (4) with the oligomer represented by the above formula (2), and subjecting the sulfonate group (—SO₃CH(CH₃)C₂H₅) to hydrolysis, so as to obtain a sulfonic acid group (—SO₃H).

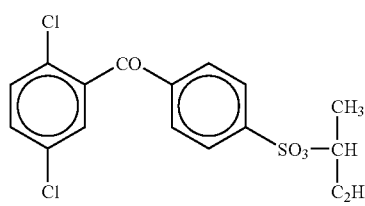

(4)

In the production method in the present example, the above sulfonated polyarylene based polymer is dissolved in a solvent such as N-methylpyrrolidone, so as to prepare a polymer electrolyte solution. Thereafter, a polymer electrominutes. As a result, the electrode catalyst layer 3 is transferred onto the polymer electrolyte membrane 1 side, so that it is connected to the polymer electrolyte membrane 1. Thereafter, when the fluorine resin mold releasing film 2 is peeled, there is obtained a laminated body 4 constituted such that the polymer electrolyte membrane 1 is sandwiched between a pair of the electrode catalyst layers 3, 3, as shown in FIG. 1(d).

Since the above electrode catalyst layer 3 is made of a catalyst paste containing the above carbon fibers, it has a porous form in which pores are formed between the carbon fibers.

Thereafter, a diffusion electrode 5 shown in FIG. 1(e) is formed. To form the diffusion electrode 5, first, polytetrafluoroethylene (PTFE) particles used as water-repellent materials are mixed with carbon black used as an electron conducting material at a weight ratio of water-repellent material:electron conducting material=5:4 for example, and the obtained mixture is then uniformly dispersed in ethylene glycol, so as to prepare a first slurry. Thereafter, the first slurry is applied on a carbon paper 6 used as a carbon substrate layer followed by drying, so as to obtain, for example, a water-repellent layer 7 having a dry film thickness of 10 to 20 μm.

Thereafter, carbon black used as an electron conducting material and the above carbon fibers used as pore-forming materials are uniformly dispersed in a perfluoroalkylene sulfonic acid polymer (e.g., Nafion (trade name) by DuPont) solution used as an ion conducting material solution at a weight ratio of electron conducting material:pore-forming material:ion conducting material=5:4:14 for example, so as to prepare a second slurry. Thereafter, the second slurry is applied on the water-repellent layer 7 followed by drying, so as to obtain, for example, a hydrophilic layer 8 having a dry film thickness of 2 to 10 μm.

As a result, the diffusion electrode 5 is constituted such that the water-repellent layer 7 is placed on the carbon paper 6 and that the hydrophilic layer 8 is further placed on the water-repellent layer 7. Since the above hydrophilic layer 8 is made of the above second slurry containing the above carbon fibers, it has a porous form in which pores are formed between the carbon fibers.

After formation of the diffusion electrode 5, as shown in FIG. 1(*f*), the diffusion electrode 5 is laminated on the electrode catalyst layer 3 through the hydrophilic layer 8, and hot pressing is performed from above the carbon paper 6. The hot pressing is carried out, for example, by applying a pressure within the range between 1 and 5 MPa on the surface at a temperature of 80° C. to 140° C. for 2 to 10 minutes. As a result, a membrane-electrode structure 9 is obtained, in which the diffusion electrode 5 is connected to the electrode catalyst layer 3 through the hydrophilic layer 8.

In the membrane-electrode structure 9, the ratio of the volume of pores with a pore size of 0.01 to 1 μm formed in the electrode catalyst layer 3 to the volume of pores with a pore size of 0.01 to 1 μm formed in the hydrophilic layer 8 is less than 1.0. The ratio of the weight of an ion conducting material contained in the electrode catalyst layer 3 to the weight of an ion conducting material contained in the hydrophilic layer 8 is within the range between 1.0 and 1.4. The ratio of the weight of solid content in the electrode catalyst layer 3 to the weight of solid content in the hydrophilic layer 8 is within the range between 1.0 and 3.5.

Figure 15:
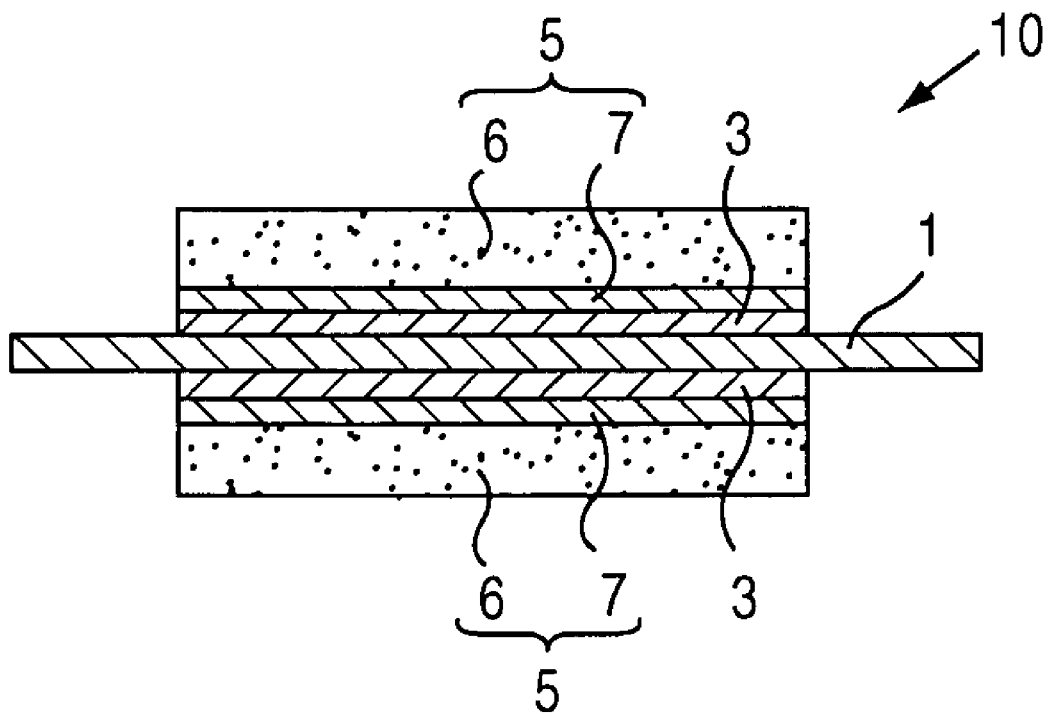
FIG. 15 is an explanatory cross-sectional view showing an example of the structure of the conventional membrane-electrode structure.

Thereafter, using the sulfonated polyarylene based polymer represented by the above formula (1), a polymer electrolyte fuel cell was produced with the membrane-electrode structure 9 obtained by the production method in the present example, and another electrolyte fuel cell was produced with a membrane-electrode structure 10 shown in FIG. 15 obtained by the same above production method with the exception that the hydrophilic layer 8 was not formed. Using the thus obtained polymer electrolyte fuel cells, electric power was generated, and terminal voltage and resistance overvoltage to current density were measured. A change in terminal voltage to current density is shown in FIG. 2, and a change in resistance overvoltage to current density is shown in FIG. 3.

It is clear from FIG. 2 that the membrane-electrode structure 9 (Example 1) in which the hydrophilic layer 8 was formed has a terminal voltage higher than that of the membrane-electrode structure 10 (Comparative example 1) in which the hydrophilic layer 8 was not formed, and that the membrane-electrode structure 9 thereby has an excellent power generation efficiency. Moreover, it is also clear that the membrane-electrode structure 9 (Example 1) in which the hydrophilic layer 8 was formed has a resistance overvoltage lower than that of the membrane-electrode structure 10 (Comparative example 1) in which the hydrophilic layer 8 was not formed, thereby having an excellent power generation efficiency.

As shown in FIGS. 2 and 3, the membrane-electrode structure 9 (Example 1) in which the hydrophilic layer 8 was formed has an excellent power generation efficiency, and thus, it is clear that an excellent adhesiveness is obtained between the electrode catalyst layer 3 and the diffusion electrode 5 in the membrane-electrode structure 9.

Figure 4:
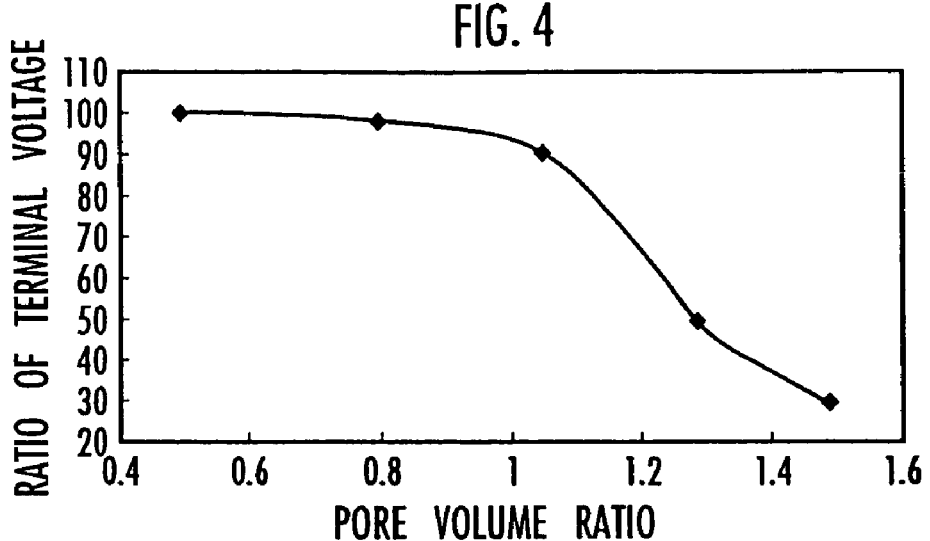
FIG. 4 is a graph showing the relationship between the ratio of the pore volume of a hydrophilic layer to that of an electrode catalyst layer and the power generation efficiency in a membrane-electrode structure obtained by the production method of the present invention.

Next, the ratio ($V_B/V_A$) of the volume ($V_B$) of pores with a pore size of 0.01 to 1 μm formed in the electrode catalyst layer 3 to the volume ($V_A$) of pores with a pore size of 0.01 to 1 μm formed in the hydrophilic layer 8 in the membrane-electrode structure 9 was fluctuated within the range between 0.5 and 1.5. A change in terminal voltage to the above ratio ($V_B/V_A$) is shown in FIG. 4. In the figure, the value of the highest terminal voltage in the membrane-electrode structure 9 is set to 100, and each of the measured terminal voltages is defined as a ratio to the highest terminal voltage.

It is clear from FIG. 4 that when the above ratio ($V_B/V_A$) is less than 1.0, an excellent adhesiveness is obtained between the electrode catalyst layer 3 and the diffusion electrode 5 and that it does not affect power generation efficiency. In contrast, when the above ratio ($V_B/V_A$) exceeds 1.0, the diffusion of gas is inhibited by the hydrophilic layer 8, and concentration overvoltage increases, thereby causing a decrease in power generation efficiency.

Figure 5:
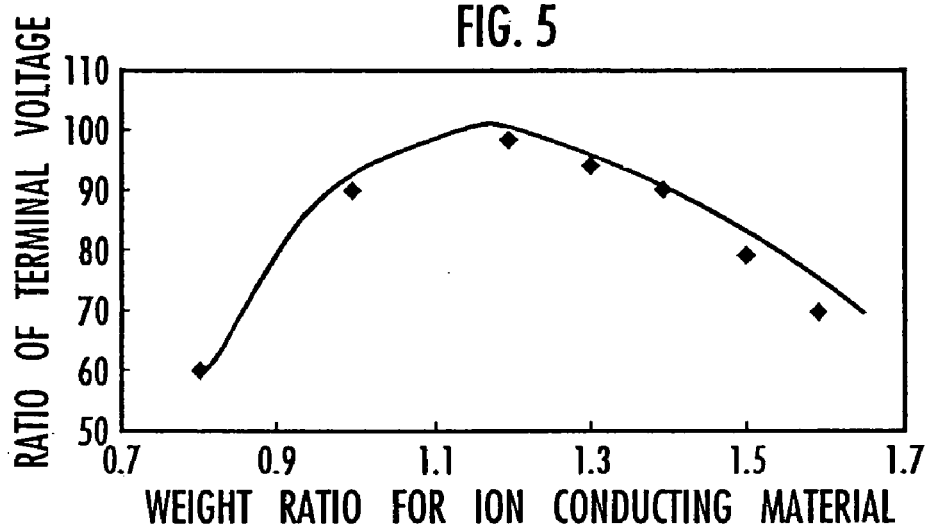
FIG. 5 is a graph showing the relationship between the weight ratio of an ion conducting material in a hydrophilic layer to that in an electrode catalyst layer and the power generation efficiency in a membrane-electrode structure obtained by the production method of the present invention.

Next, in the membrane-electrode structure 9, the ratio ($W_{B1}/W_{A1}$) of the weight ($W_{B1}$) of an ion conducting material contained in the electrode catalyst layer 3 to the weight ($W_{A1}$) of an ion conducting material contained in the hydrophilic layer 8 was fluctuated within the range between 0.8 and 1.6. A change in terminal voltage to the above ratio ($W_{B1}/W_{A1}$) is shown in FIG. 5. In the figure, the value of the highest terminal voltage in the membrane-electrode structure 9 is set to 100, and each of the measured terminal voltages is defined as a ratio to the highest terminal voltage.

It is clear from FIG. 5 that when the above ratio ($W_{B1}/W_{A1}$) is within the range between 1.0 and 1.4, an excellent adhesiveness is obtained between the electrode catalyst layer 3 and the diffusion electrode 5 and that it does not affect power generation efficiency. In contrast, when the above ratio ($W_{B1}/W_{A1}$) is less than 1.0, activation overvoltage increases, and when the above ratio ($W_{B1}/W_{A1}$) exceeds 1.4, concentration overvoltage increases, thereby decreasing power generation efficiency.

Accordingly, only when the above ratio ($W_{B1}/W_{A1}$) is within the range between 1.0 and 1.4, an excellent adhesiveness is obtained between the electrode catalyst layer 3 and the diffusion electrode 5 without decreasing power generation efficiency.

Figure 6:
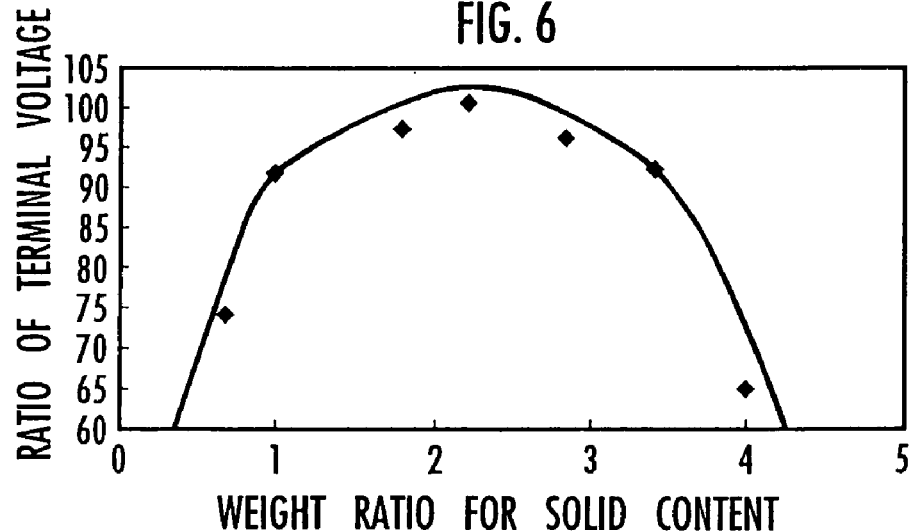
FIG. 6 is a graph showing the relationship between the weight ratio of solid content in a hydrophilic layer to that in an electrode catalyst layer and the power generation efficiency in a membrane-electrode structure obtained by the production method of the present invention.

Next, in the membrane-electrode structure 9, the ratio ($W_{B2}/W_{A2}$) of the weight ($W_{B2}$) of solid content in the electrode catalyst layer 3 to the weight ($W_{A2}$) of solid content in the hydrophilic layer 8 is fluctuated within the range between 0.8 and 4.0. A change in terminal voltage to the above ratio ($W_{B2}/W_{A2}$) is shown in FIG. 6. In the figure, the value of the highest terminal voltage in the membrane-electrode structure 9 is set to 100, and each of the measured terminal voltages is defined as a ratio to the highest terminal voltage.

It is clear from FIG. 6 that when the above ratio ($W_{B2}/W_{A2}$) is within the range between 1.0 and 3.5, an excellent adhesiveness is obtained between the electrode catalyst layer 3 and the diffusion electrode 5 and that it does not affect power generation efficiency. In contrast, when the above ratio ($W_{B2}/W_{A2}$) is less than 1.0, activation overvoltage increases, and when the above ratio ($W_{B2}/W_{A2}$) exceeds 3.5, concentration overvoltage increases, thereby decreasing power generation efficiency.

EXAMPLES 2 AND 3

Next, the method for producing a membrane-electrode structure of the present examples will be described with reference to FIGS. 1(a)-(f)

In the production method in the present examples, first, a sulfonated polyarylene based polymer is prepared completely in the same manner as in Example 1. Then, the sulfonated polyarylene based polymer is dissolved in a solvent such as N-methylpyrrolidone, so as to prepare a polymer electrolyte solution. Thereafter, a polymer electrolyte membrane is prepared from the above polymer electrolyte solution by the cast method, and the membrane is dried in an oven, so as to form, e.g., a polymer electrolyte membrane 1 having a dry film thickness of 30 to 50 82 m, as shown in FIG. 1(a).

Subsequently, a catalyst such as platinum is supported by an electron conducting material such as carbon black (furnace black) at a weight ratio of catalyst:electron conducting material=1:1 for example, so as to prepare catalyst particles. Thereafter, the above catalyst particles are uniformly dispersed in a perfluoroalkylene sulfonic acid polymer (e.g., Nafion (trade name) manufactured by DuPont) solution used as an ion conducting material solution at a weight ratio of catalyst particle:ion conducting material=1:1 for example, so as to prepare a catalyst paste.

Thereafter, the above catalyst paste is screen printed on a fluorine resin mold releasing film 2 as shown in FIG. 1(b) such that the above catalyst is kept thereon in an amount of 0.5 mg/cm² for example. The catalyst paste is then dried at 100° C. for 30 minutes for example, so as to form an electrode catalyst layer 3. Thereafter, as shown in FIG. 1(c), the polymer electrolyte membrane 1 is sandwiched between a pair of the electrode catalyst layers 3, 3, and hot pressing is then performed from above the fluorine resin mold releasing film 2.

The hot pressing is carried out, for example, by applying a pressure within the range between 1 and 5 MPa on the surface at a temperature of 100° C. to 150° C. for 5 to 30 minutes. As a result, the electrode catalyst layer 3 is transferred onto the polymer electrolyte membrane 1 side, so that it is connected to the polymer electrolyte membrane 1. Thereafter, when the fluorine resin mold releasing film 2 is peeled, there is obtained a laminated body 4 constituted such that the polymer electrolyte membrane 1 is sandwiched between a pair of the electrode catalyst layers 3, 3, as shown in FIG. 1(d).

Thereafter, a diffusion electrode 5 shown in FIG. 1(e) is formed. To form the diffusion electrode 5, first, polytetrafluoroethylene (PTFE) particles used as water-repellent materials are mixed with carbon black used as an electron conducting material at a weight ratio of water-repellent material:electron conducting material=6:4 for example, and the obtained mixture is then uniformly dispersed in ethylene glycol, so as to prepare a first slurry. Thereafter, the first slurry is applied on a carbon paper 6 used as a carbon substrate layer followed by drying, so as to obtain, for example, a water-repellent layer 7 having a dry film thickness of 10 to 40 μm.

Thereafter, carbon black used as an electron conducting material and carbon fibers (e.g., VGCF (trade name) manufactured by Showa Denko K.K.) used as pore-forming materials are mixed into a perfluoroalkylene sulfonic acid polymer (e.g., Nafion (trade name) manufactured by DuPont) solution used as an ion conducting material solution at a weight ratio of electron conducting material:pore-forming material:ion conducting material=1:1:1, for example. Thereafter, ultrasonic wave is applied thereto, for example, for 10 minutes to make them uniformly disperse. Thus, a second slurry is prepared. The second slurry is applied on the water-repellent layer 7 followed by drying at 100° C. for 30 minutes for example, so as to obtain, for example, a hydrophilic layer 8 with an applied amount after drying of 0.1 to 1.2 mg/cm².

As a result, the diffusion electrode 5 is constituted such that the water-repellent layer 7 is placed on the carbon paper 6 and that the hydrophilic layer 8 is further placed on the water-repellent layer 7. Since the above hydrophilic layer 8 is made of the above second slurry containing the above carbon fibers, it has a porous form in which pores are formed between the carbon fibers.

After formation of the diffusion electrode 5, as shown in FIG. 1(f), the diffusion electrode 5 is laminated on the electrode catalyst layer 3 through the hydrophilic layer 8, and hot pressing is performed from above the carbon paper 6. The hot pressing is carried out, for example, by applying a pressure within the range between 1 and 5 MPa on the surface at a temperature of 100° C. to 150° C. for 5 to 30 minutes. As a result, a membrane-electrode structure 9 is obtained, in which the diffusion electrode 5 is connected to the electrode catalyst layer 3 through the hydrophilic layer 8.

Thereafter, using the sulfonated polyarylene based polymer represented by the above formula (1), the following 3 types of membrane-electrode structures were prepared: a membrane-electrode structure 9 (Example 2) in which the applied amount of the hydrophilic layer 8 after drying was set to 0.35 mg/cm²; another membrane-electrode structure 9 (Example 3) in which the applied amount of the hydrophilic layer 8 after drying was set to 0.70 mg; and another membrane-electrode structure 10 (Comparative example 2) as shown in FIG. 15 in which the hydrophilic layer 8 was not formed at all. These 3 types of membrane-electrode structures were measured in terms of the maximum height Rmax of surface roughness, the ratio of the surface area to the unit area, and the differential pressure between one side of the diffusion electrode 4 and the other side thereof obtained when the air was supplied at a flow rate of 0.5 L/cm²/min in the direction of the thickness of the diffusion electrode 4. The results are shown in Table 1.

Moreover, electric power was generated using the membrane-electrode structures 9 of Examples 2 and 3 and the membrane-electrode structure 10 of Comparative example 2. A change in terminal voltage to current density is shown in FIG. 7.

TABLE 1

|  | Rmax (μm) | Surface area/ unit area | Differential pressure (mmAq) |
| --- | --- | --- | --- |
| Example 2 | 32.5 | 1.23 | 220 |
| Example 3 | 30 | 1.21 | 300 |
| Comparative Example 2 | 43 | 1.28 | 50 |

Figure 7:
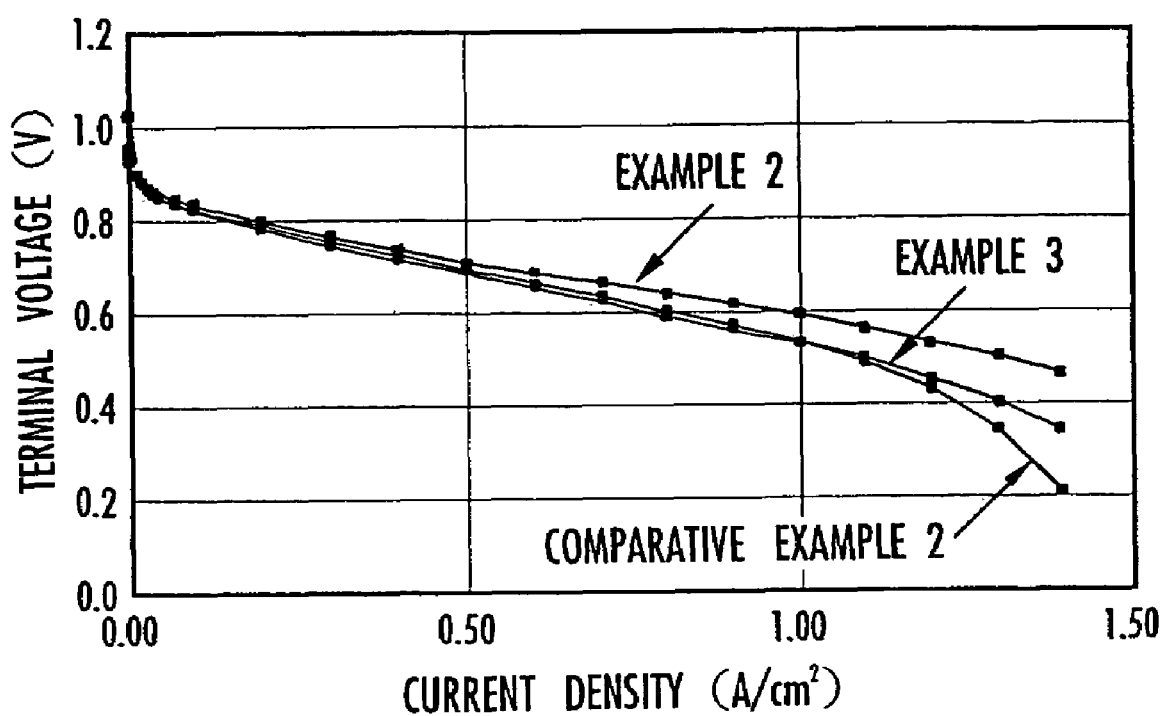
FIG. 7 is a graph showing an example of the power generation efficiency of a membrane-electrode structure, whose unevenness of the surface of a diffusion electrode thereof is reduced by the production method of the present invention.

From Table 1 and FIG. 7, it is clear that the membrane-electrode structures 9 of Examples 2 and 3 in which the maximum height Rmax of surface roughness is 40 μm or lower, the ratio of the surface area to the unit area is 1.25 or less, and the differential pressure between one side of the diffusion electrode 4 and the other side thereof is 100 to 300 mmAq, have a superior power generation efficiency to that of the membrane-electrode structure 10 of Comparative example 2 in which the maximum height Rmax of surface roughness is over 40 μm, the ratio of the surface area to the unit area is over 1.25, and the differential is less than 100 mmAq.

As shown in FIG. 1(f), since the membrane-electrode structures 9 (Examples 2 and 3) in which the hydrophilic layer 8 is formed have an excellent power generation efficiency, it is clear that an excellent adhesiveness is obtained between the electrode catalyst layer 3 and the diffusion electrode 5 in such membrane-electrode structures 9.

Next, the applied amount of the hydrophilic layer 8 after drying was altered in the range between 0 and 12 mg/cm$^2$, so that the differential pressure between one side of the diffusion electrode 4 and the other side thereof was altered in the range between 50 and 350 mmAq, when the air was supplied at a flow rate of 0.5 L/cm$^2$/min in the direction of the thickness of the above diffusion electrode 4. Thus, several types of membrane-electrode structures 9 were produced, and electric power was generated using these structures. The relationship between the above differential pressure and the terminal voltages obtained at current densities of 0.7 A/cm$^2$ and 1.4 A/cm$^2$ in each of the above membrane-electrode structures 9 is shown in FIG. 8.

Figure 8:
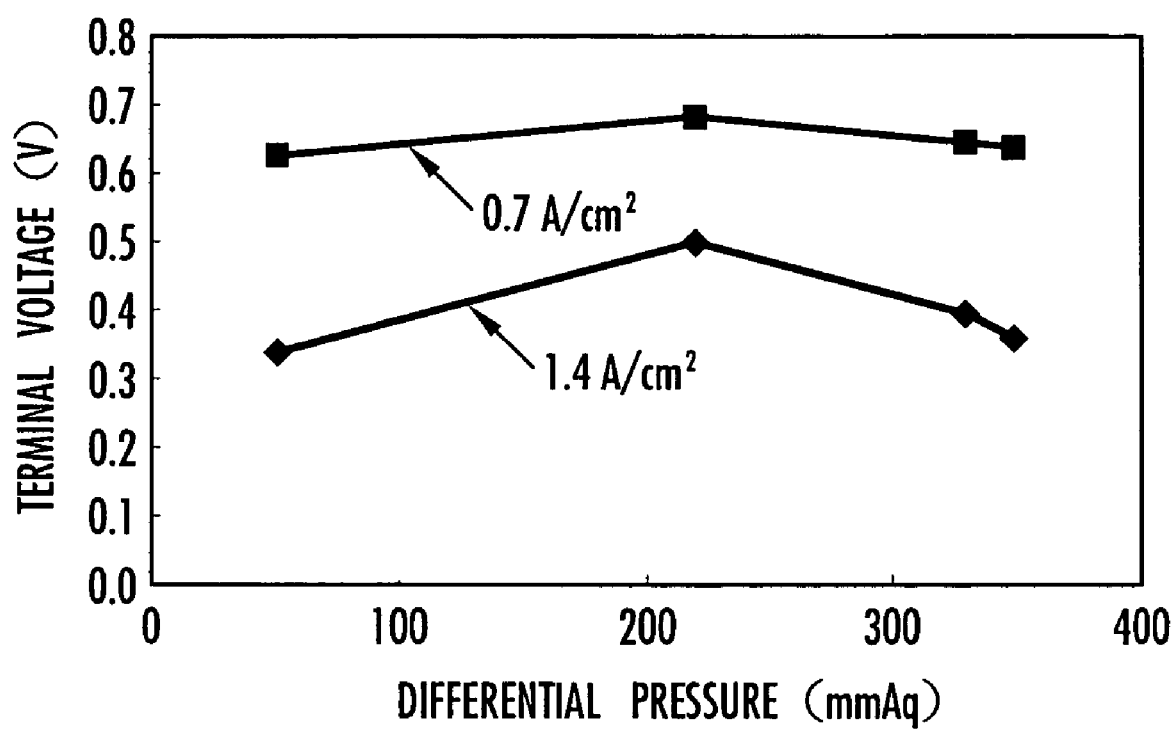
FIG. 8 is a graph showing another example of the power generation efficiency of a membrane-electrode structure whose unevenness of the surface of a diffusion electrode thereof is reduced by the production method of the present invention.

It is clear from FIG. 8 that membrane-electrode structures 9 having a differential pressure between 100 and 300 mmAq have a superior power generation efficiency to that of membrane-electrode structures 9 having a differential pressure of less than 100 mmAq or more than 300 mmAq.

In Examples 1 to 3, the use of the polymer electrolyte membrane 1 consisting of a sulfonated polyarylene based polymer is described as an example. However, any type of polymer may be used as such a polymer electrolyte membrane 1, as long as it has ion conductivity. A perfluoroalkylene sulfonic acid polymer (e.g., Nafion (trade name) manufactured by DuPont)) may be an example of such a polymer.

EXAMPLE 4

Next, the method for producing a membrane-electrode structure of the present examples will be described with reverence to FIGS. 9(a)-(f).

In the production method in the present example, first, a sulfonated polyarylene based polymer is prepared completely in the same manner as in Example 1 with the exception that sulfonation is carried out to obtain an ion exchange capacity of 1.8 meq/g. Then, the sulfonated polyarylene based polymer is dissolved in a solvent such as N-methylpyrrolidone, so as to prepare a polymer electrolyte solution. Thereafter, a polymer electrolyte membrane is prepared from the above polymer electrolyte solution by the cast method, and the membrane is dried in an oven, so as to form, e.g., a polymer electrolyte membrane 1 having a dry film thickness of 35 μm, as shown in FIG. 9(a).

Subsequently, a platinum particle is supported by carbon black (furnace black) at a weight ratio of carbon black: platinum particle=1:1 for example, so as to prepare catalyst particles. Thereafter, the above catalyst particles and carbon fibers (e.g., VGCF (trade name) manufactured by Showa Denko K.K.) used as pore-forming materials are uniformly dispersed in a perfluoroalkylene sulfonic acid polymer (e.g., Nafion (trade name) manufactured by DuPont) used as an ion conducting polymer binder at a weight ratio of catalyst particle:carbon fiber ion conducting polymer binder=1:0.5: 1.4 for example, so as to prepare a first catalyst paste.

Thereafter, the above first catalyst paste is applied on a fluorine resin-laminated mold releasing film 2 (e.g., Fluoroju (trade name) manufactured by Mitsubishi Plastics, Inc.) as shown in FIG. 9(b), using a coater, such that the above first catalyst paste is kept thereon in a platinum amount of 0.5 mg/cm$^2$ for example. The applied catalyst paste is then dried, so as to form a cathode electrode catalyst layer 3a. The surface of the fluorine resin-laminated mold releasing film 2 has a contact angle to water of 55° to 105°.

Figure 10:
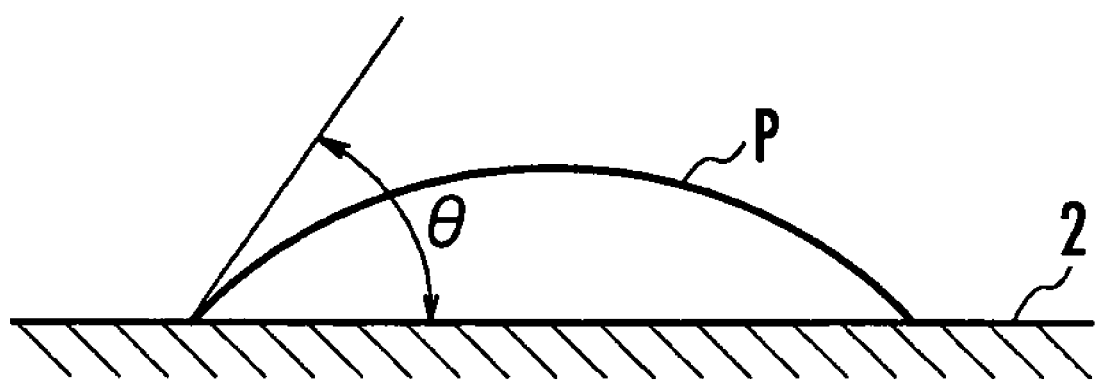
FIG. 10 is a view showing the definition of a contact angle.

As shown in FIG. 10, the contact angle is expressed as an angle θ that is formed between the tangent of a water drop P at a point where the water drop P comes into contact with the fluorine resin-laminated mold releasing film 2 and the surface of the above film. As the value of the angle θ decreases, the surface of the fluorine resin mold releasing film 2 has an increased affinity for water, and thus, it shows that it is easily wet by water.

The above drying is carried out such that solvent content in the electrode catalyst layer 3a after drying makes up 20% or less by weight based on the total weight thereof. Since the electrode catalyst layer 3a formed by the above drying is made of the first catalyst paste containing the above carbon fibers, it has a porous form in which pores are formed between the carbon fibers.

Thereafter, a platinum-ruthenium alloy (e.g., platinum: ruthenium=3:2 (weight ratio)) is supported by carbon black (furnace black) at a weight ratio of carbon black:platinum-ruthenium alloy=1:1 for example, so as to prepare catalyst particles. Thereafter, the above catalyst particles are uniformly dispersed in an organic solvent solution containing a perfluoroalkylene sulfonic acid polymer used as an ion conducting polymer binder solution at a weight ratio of catalyst particle:ion conducting polymer binder=1:1.6 for example, so as to prepare a second catalyst paste.

Thereafter, using a coater, the above second catalyst paste is applied on the fluorine resin-laminated mold releasing film 2 as shown in FIG. 9(b) such that the above second catalyst paste is kept thereon in a catalyst amount of 0.5 mg/cm$^2$ for example. The applied catalyst paste is then dried, so as to form an anode electrode catalyst layer 3b. The above drying is carried out such that solvent content in the electrode catalyst layer 3b after drying makes up 20% or less by weight based on the total weight thereof.

Thereafter, as shown in FIG. 9(c), the polymer electrolyte membrane 1 is sandwiched between a pair of the electrode catalyst layers 3a and 3b, and hot pressing is then performed from above the fluorine resin-laminated mold releasing film 2. The hot pressing is carried out, for example, by applying a pressure of 4 MPa on the surface at a temperature of 160° C. for 15 minutes. As a result, the electrode catalyst layers 3a and 3b are transferred onto the polymer electrolyte membrane 1 side, so that they are connected to the polymer electrolyte membrane 1. Thereafter, when the fluorine resin-laminated mold releasing film 2 is peeled, there is obtained a laminated body 4 constituted such that the polymer electrolyte membrane 1 is sandwiched between a pair of the electrode catalyst layers 3a and 3b, as shown in FIG. 9(d).

Subsequently, carbon black is mixed with polytetrafluoroethylene (PTFE) particles at a weight ratio of 4:6, for example. The obtained mixture is then uniformly dispersed in ethylene glycol, so as to prepare a slurry. Thereafter, the slurry is applied on one side of a carbon paper 6 shown in FIG. 9(e) followed by drying, so as to obtain a water-repellent layer 7. Thereafter, carbon black and the above carbon fibers are uniformly dispersed in an organic solvent solution containing a perfluoroalkylene sulfonic acid polymer used as the ion conducting polymer binder solution at a weight ratio of carbon black:carbon fiber:ion conducting polymer binder=1:0.5:1, for example, so as to obtain a slurry. This slurry is further applied on the above water-repellent layer 7 followed by drying, so as to form a hydrophilic layer 8. As a result, a diffusion electrode 5 is constituted such that the water-repellent layer 7 is placed on the carbon paper 6 and that the hydrophilic layer 8 is further placed on the water-repellent layer 7.

Figure 9:
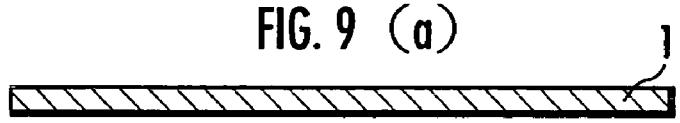
FIGS. 9(a)-(f) are views illustrating a production process, which schematically show an example of the method for producing a membrane-electrode structure of the present invention.
Figure 9:
Figure 9:
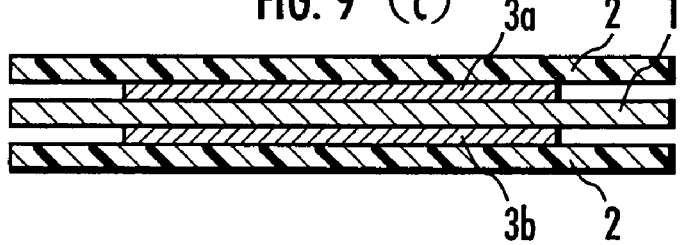
Figure 9:
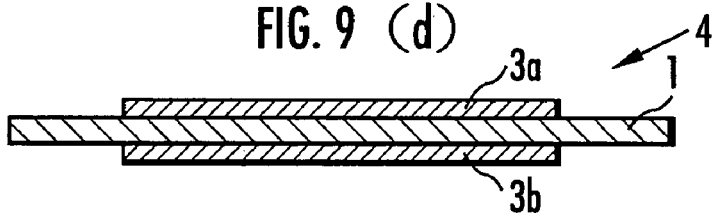
Figure 9:
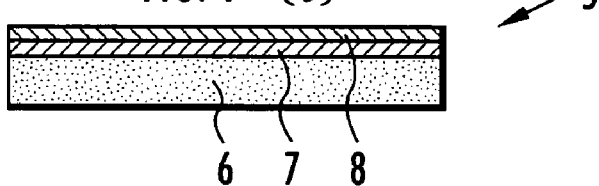
Figure 9:
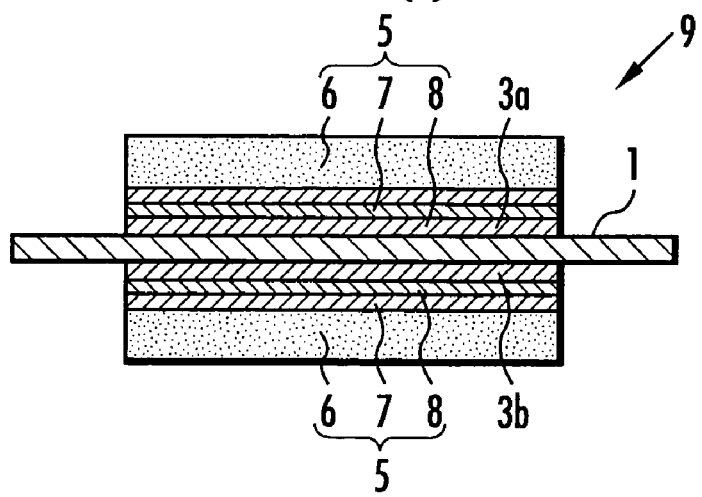

After formation of the diffusion electrode 5, as shown in FIG. 9(*f*), the diffusion electrode 5 is laminated on the electrode catalyst layer 3 through the hydrophilic layer 8, and hot pressing is performed from above the carbon paper 6. The hot pressing is carried out, for example, by applying a pressure of 3 MPa on the surface at a temperature of 120° C. for 6 minutes. As a result, a membrane-electrode structure 9 is obtained, in which the diffusion electrode 5 is connected to the electrode catalyst layers 3*a* and 3*b* through the hydrophilic layer 8.

Thereafter, a polymer electrolyte membrane 1 was prepared from the sulfonated polyarylene based polymer solution represented by the above formula (1). At the same time, several membrane-electrode structures 9 were produced, while solvent content in the electrode catalyst layers 3*a* and 3*b* after drying is altered in the range between 2% and 25% by weight. Each membrane-electrode structure 9 was measured in terms of adhesion rate that is an index of the adhesiveness between the polymer electrolyte membrane 1 and the electrode catalyst layers 3*a* and 3*b*. The adhesion rate was determined by thermally transferring the electrode catalyst layers 3*a* and 3*b* to the polymer electrolyte membrane 1, peeling the fluorine resin-laminated mold releasing film 2, and subjecting to image analysis the area of the electrode catalyst layers 3*a* and 3*b* left on the fluorine resin-laminated mold releasing film 2. Then, the area of the electrode catalyst layers 3*a* and 3*b* adhered to the polymer electrolyte membrane 1 was calculated by subtracting the area of the electrode catalyst layers 3*a* and 3*b* left on the fluorine resin-laminated mold releasing film 2 from the total area of the electrode catalyst layers 3*a* and 3*b*. The ratio of the thus calculated area to the total area of the electrode catalyst layers 3*a* and 3*b* was obtained. The results are shown in FIG. 11.

Figure 11:
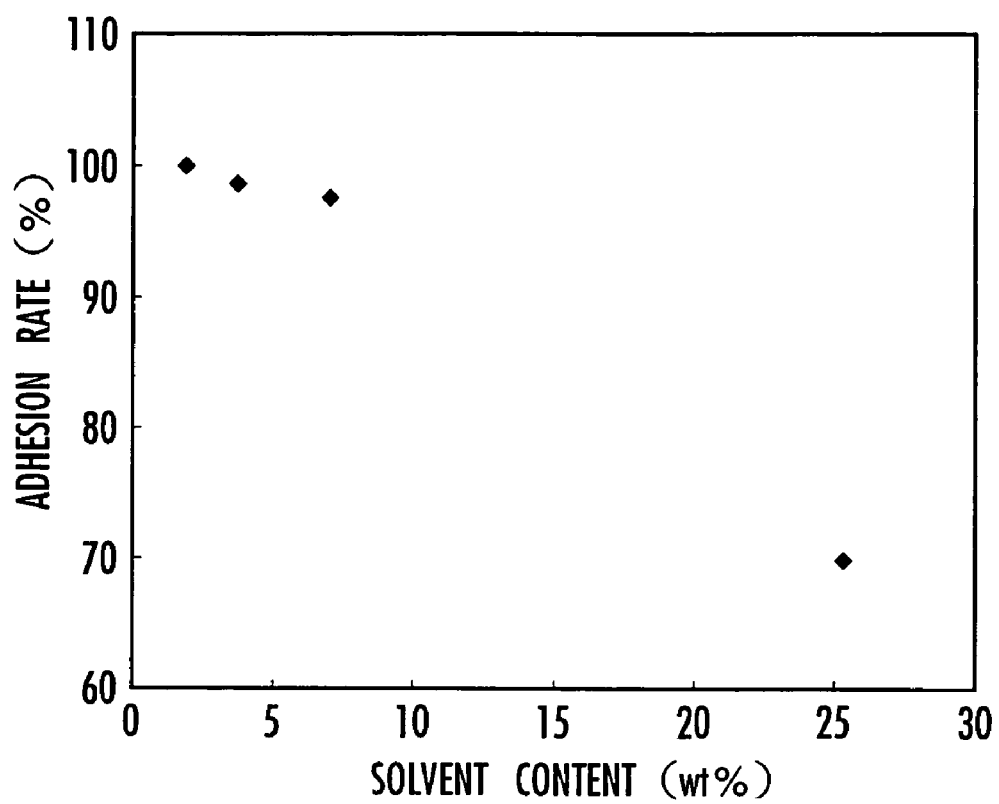
FIG. 11 is a graph showing the adhesiveness between a polymer electrolyte membrane and an electrode catalyst layer, which involves solvent contents in the electrode catalyst layer.

It is clear from FIG. 11 that when the amount of solvents contained in the electrode catalyst layers 3*a* and 3*b* after drying is 20% or less by weight, the adhesion rate is significantly higher than the case of 25% by weight, and that even though thermal transfer is carried out under conditions more moderate than conventional conditions, such as an applied pressure of 1 to 5 MPa, an excellent adhesiveness can be obtained between the electrolyte membrane 1 and the electrode catalyst layers 3*a* and 3*b*.

Moreover, according to the membrane-electrode structure 9 in the present example, since the thermal transfer can be carried out with a pressure of 1 to 5 MPa, the carbon fibers used as pore-forming materials contained in the electrode catalyst layers 3*a* and 3*b* are not excessively compressed. Accordingly, a certain amount of pores are formed in the electrode catalyst layers 3*a* and 3*b*, thereby ensuring the diffusibility of gas.

Subsequently, several membrane-electrode structures 9 were produced, while the contact angle to water of the surface of the fluorine resin-laminated mold releasing film 2 was altered in the range between 55° and 105°. The adhesion rate of each of the obtained membrane-electrode structures 9 was measured. The adhesion rate was determined by the same method as for the adhesion rate shown in FIG. 11. The results are shown in FIG. 12.

Figure 12:
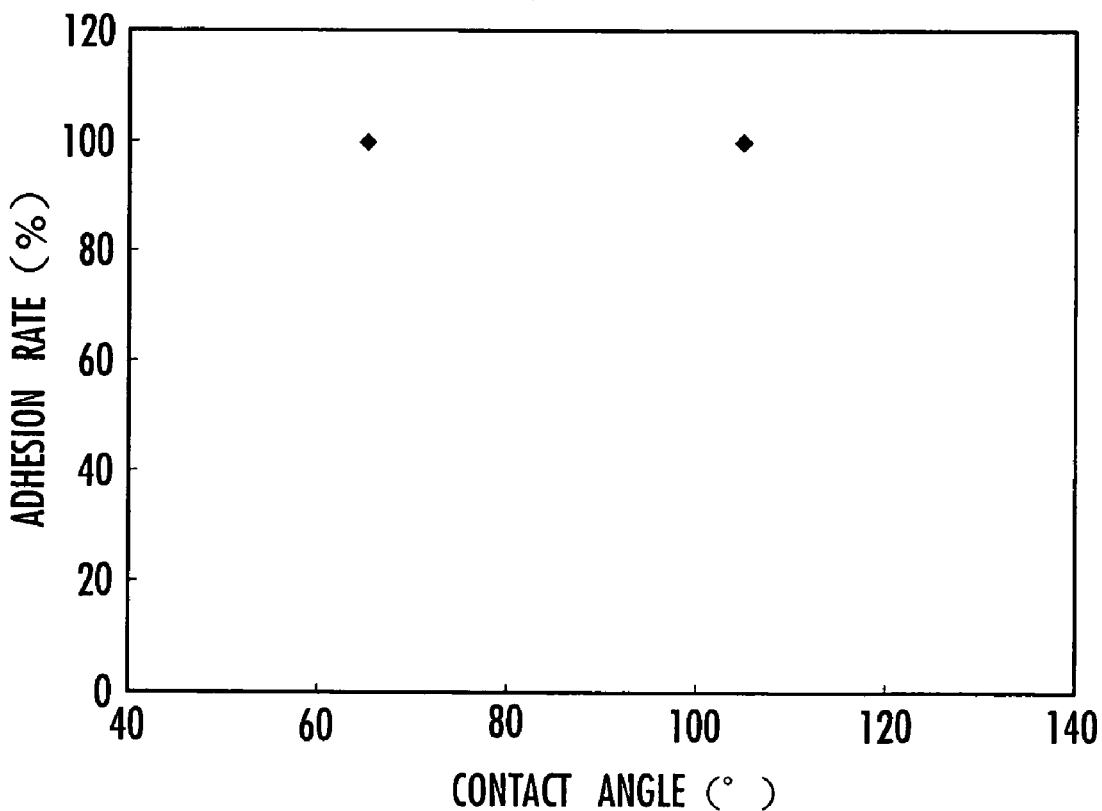
FIG. 12 is a graph showing the adhesiveness between a polymer electrolyte membrane and an electrode catalyst layer, which involves a contact angle of the surface of a sheet substrate.

It is clear from FIG. 12 that when the contact angle is within the range between 55° and 105°, an excellent adhesiveness can be obtained between the electrolyte membrane 1 and the electrode catalyst layers 3*a* and 3*b*. When the contact angle is less than 55°, it becomes difficult to transfer the formed electrode catalyst layers 3*a* and 3*b* onto the polymer electrolyte membrane 1 side, and when the contact angle exceeds 105°, it becomes difficult to apply each catalyst paste to the fluorine resin-laminated mold releasing film 2. Thus, the membrane-electrode structure 9 could not be produced in both above cases.

Subsequently, when the diffusion electrodes 5, 5 were laminated on the electrode catalyst layers 3*a* and 3*b* of the laminated body 4 shown in FIG. 9(*d*) and then pressed under heating, the applied pressure was altered in the range between 0.5 and 8 MPa. Thus, several membrane-electrode structures 9 were produced. The maximum separation amount in the carbon paper 6 of each membrane-electrode structure 9 was measured. The maximum separation amount was determined by observing by an electron microscope a separation distance in the carbon paper 6 at a cross section of the membrane-electrode structure 9. The results are shown in FIG. 13.

Figure 13:
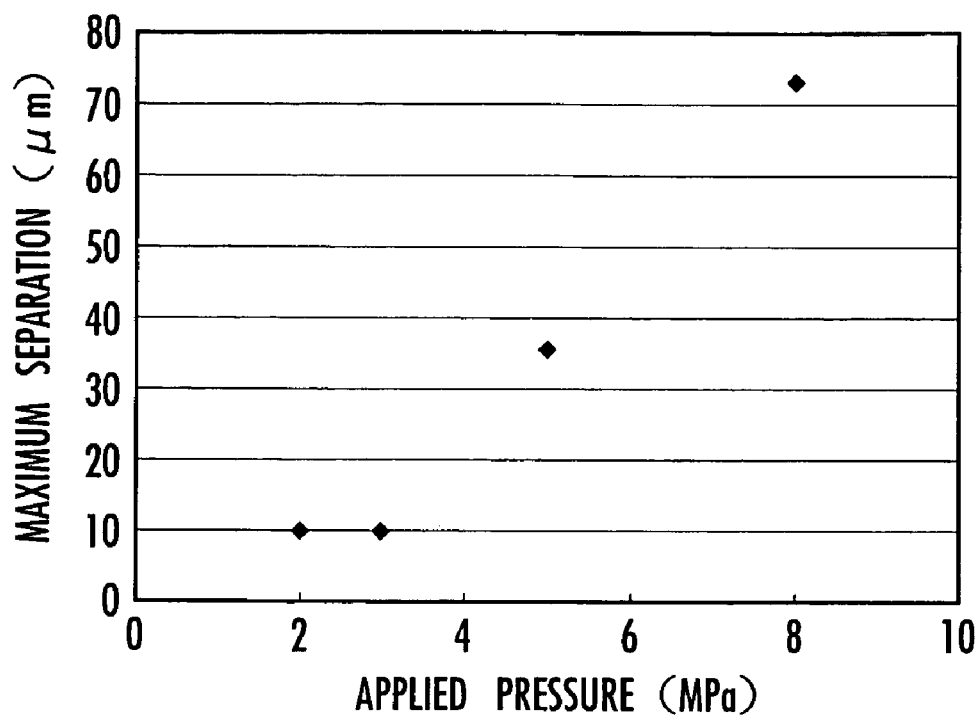
FIG. 13 is a graph showing the relationship between a pressure applied when a backing layer is laminated on each electrode catalyst layer and pressed under heating, and an intralayer separation of the backing layer.

It is clear from FIG. 13 that when the applied pressure is within the range between 0.5 and 4 MPa, the maximum separation amount is much smaller than that of a case where the applied pressure exceeds 4 MPa, and that the electrode catalyst layers 3*a* and 3*b* are favorably connected to the diffusion electrodes 5, 5.

Subsequently, in order to examine the influence of the applied pressure on the diffusion electrode 5, when the diffusion electrodes 5, 5 are laminated on the electrode catalyst layers 3*a* and 3*b* of the laminated body 4 shown in FIG. 9(*d*) and then pressed under heating, a pressure is applied only to the diffusion electrode 5. In this process, the applied pressure was altered in the range between 0 and 6 MPa, and the resistance and differential pressure of the diffusion electrode 5 were measured. The resistance was determined by sandwiching the diffusion electrode 5 by gold-plated measuring terminals, using the four-terminal method. The differential pressure was determined by sandwiching the diffusion electrode 5 by a pair of conductors capable of passing the air, and measuring the pressure loss generated between the upstream and the downstream when a certain amount of the air was flown from one conductor to the other through the diffusion electrode 5. The results are shown in FIG. 14.

Figure 14:
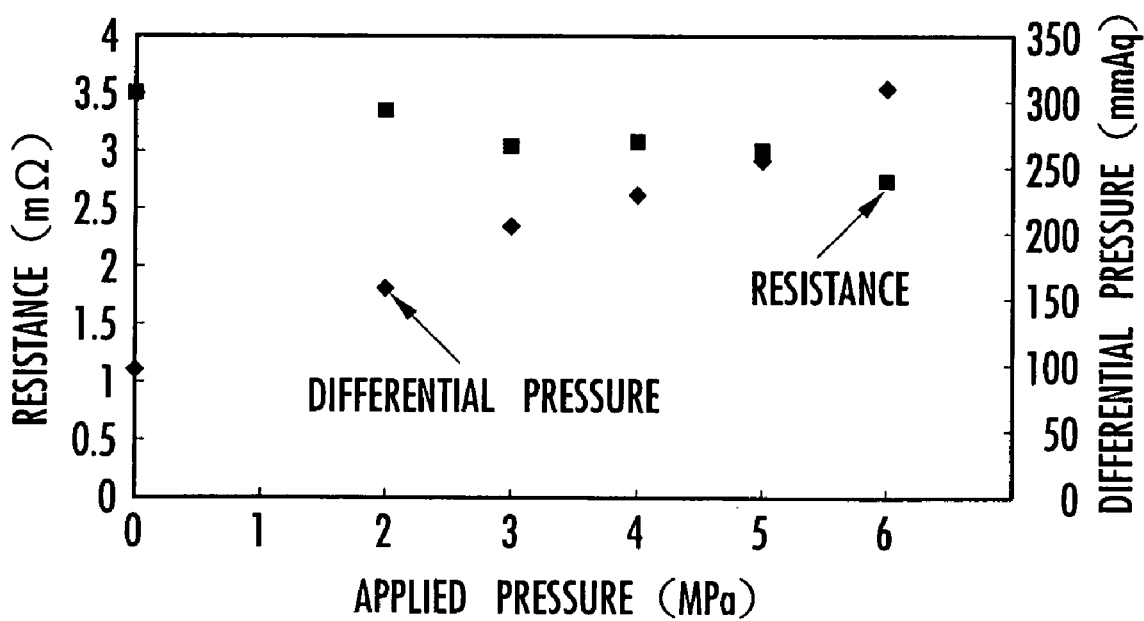
FIG. 14 is a graph showing the relationship between the resistance of a backing layer against the pressure applied, when the backing layer is laminated on each electrode catalyst layer and pressed under heating, and a differential pressure.

It is clear from FIG. 14 that both the resistance and the differential pressure are small under the applied pressure within the range of 0.5 and 4 MPa, and electric conductivity and gas diffusion are both favorable. In contrast, when the applied pressure is less than 0.5 MPa, the resistance is greater than a case where the applied pressure is 0.5 to 4 MPa, and electric conductivity is clearly lower. Moreover, when the applied pressure exceeds 4 MPa, the differential pressure is greater than a case where the applied pressure is 0.5 to 4 MPa, and the gas diffusion in the diffusion electrode 5 is clearly insufficient.

What is claimed is:

1. A method for producing a membrane-electrode structure, comprising the steps of:
    applying a catalyst paste onto a sheet substrate, wherein the catalyst paste comprises an electron conducting material supporting a catalyst and an ion conducting material;
    drying the catalyst paste to form an electrode catalyst layer;
    thermally transferring said electrode catalyst layer onto each side of a polymer electrolyte membrane to form a laminated body, wherein said electrode catalyst layer is connected to each side of said polymer electrolyte membrane;
    applying a first slurry onto a carbon substrate layer, wherein the first slurry comprises a water-repellent material and an electron conducting material;
    drying the first slurry to form a water-repellent layer;
    applying a second slurry onto said water repellent layer, wherein the second slurry comprises an electron conducting material and an ion conducting material;
    drying the second slurry to form a hydrophilic layer, wherein a diffusion electrode consisting of said carbon substrate, said water-repellent layer and said hydrophilic layer is formed;
    positioning said diffusion electrode on said electrode catalyst layer of said laminated body via said hydrophilic layer; and
    pressing said laminated body and said diffusion electrode together under heating to integrate said laminated body and said diffusion electrode,
    wherein said hydrophilic layer and said electrode catalyst layer are formed using a ratio of a weight of said ion conducting material contained in said electrode catalyst layer to a weight of said ion conducting material in said hydrophilic layer that is set within a range of 1.0 to 1.4.

2. The method for producing a membrane-electrode structure according to claim 1, wherein said second slurry comprises a pore-forming material.

3. The method for producing a membrane-electrode structure according to claim 1, wherein said catalyst paste comprises a pore-forming material.

4. The method for producing a membrane-electrode structure according to claim 1, wherein each of said catalyst paste and said second slurry comprises a pore-forming material, and wherein said hydrophilic layer and said electrode catalyst layer are formed using a ratio of a volume of pores with a pore size of 0.01 to 1 .m formed in said electrode catalyst layer by said pore-forming material to a volume of pores with a pore size of 0.01 to 1 .m formed in said hydrophilic layer by said pore-forming material that is less than 1.0.

5. The method for producing a membrane-electrode structure according to claim 1, wherein said hydrophilic layer and said electrode catalyst layer are formed using a ratio of a weight of solid content in said electrode catalyst layer to a weight of solid content in said hydrophilic layer that is set within a range of 1.0 to 3.5.

6. The method for producing a membrane-electrode structure according to claim 1, wherein said hydrophilic layer has a maximum height surface roughness, Rmax, of 40 μm or less.

7. The method for producing a membrane-electrode structure according to claim 6, wherein said hydrophilic layer has a ratio of a surface area to a unit area that is 1.25 or less.

8. The method for producing a membrane-electrode structure according to claim 6, wherein a differential pressure between one side of said diffusion electrode and the other side is set within a range between 100 and 300 mmAq, when air is supplied at a flow rate of 0.5 L/cm$^2$/min in a direction of a thickness of said diffusion electrode.

9. The method for producing a membrane-electrode structure according to claim 1, wherein said polymer electrolyte membrane is formed from a sulfonated polyarylene based polymer solution, and when said catalyst paste comprises catalyst particles consisting of a catalyst supported by carbon particles, an organic solvent solution containing a perfluoroalkylene sulfonic acid polymer, and a pore-forming material,
    said electrode catalyst layer is dried wherein a content of the solvent becomes 20% or less by weight based on a total weight of said electrode catalyst layer, and the dried electrode catalyst layer is then thermally transferred onto and connected to said polymer electrolyte membrane.

10. The method for producing a membrane-electrode structure according to claim 9, wherein the dried electrode catalyst layer is thermally transferred onto and connected to said polymer electrolyte membrane under a pressure within a range of 1 to 5 MPa.

11. The method for producing a membrane-electrode structure according to claim 9, wherein said catalyst paste is applied on a surface of said sheet substrate having a contact angle to water of 55° to 105°.

12. The method for producing a membrane-electrode structure according to claim 9, wherein when said diffusion electrode is placed on each electrode catalyst layer and then pressed under heating, and wherein said diffusion electrode and said laminated body are pressured under an applied pressure set within a range of 0.5 to 4 MPa.

13. The method for producing a membrane-electrode structure according to claim 1, wherein the membrane-electrode assembly is incorporated in a polymer electrolyte fuel cell.

* * * * *